June 21, 1949.    R. F. DEHN    2,473,942
SHEAR PRESS
Filed Dec. 22, 1945    4 Sheets-Sheet 1

INVENTOR.
BY   ROY F. DEHN
Kwis Hudson Baughton & Williams
ATTORNEYS

June 21, 1949. R. F. DEHN 2,473,942
SHEAR PRESS
Filed Dec. 22, 1945 4 Sheets-Sheet 3
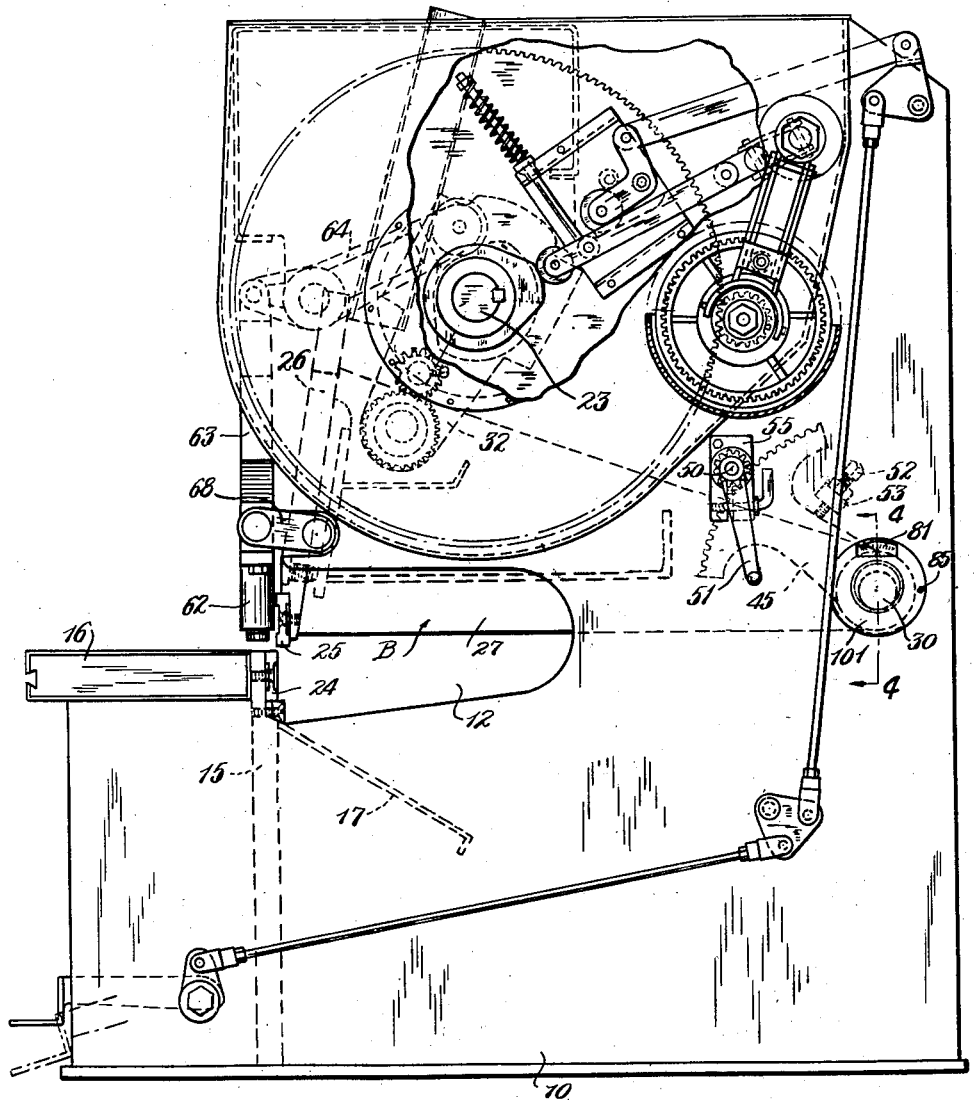
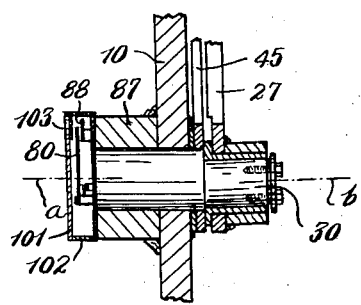
FIG. 3
FIG. 4
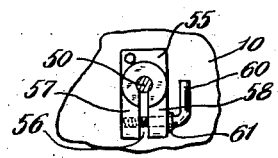
FIG. 5
INVENTOR.
ROY F. DEHN
BY
Kwis Hudson Boughton & Williams
ATTORNEYS June 21, 1949. R. F. DEHN 2,473,942
SHEAR PRESS
Filed Dec. 22, 1945 4 Sheets-Sheet 4

INVENTOR.
ROY F. DEHN
BY
Kwis Hudson Boughton & Williams
ATTORNEYS

Patented June 21, 1949

2,473,942

UNITED STATES PATENT OFFICE 2,473,942

SHEAR PRESS

Roy F. Dehn, Cleveland, Ohio, assignor to The Cleveland Crane & Engineering Company, Wickliffe, Ohio, a corporation of Ohio Application December 22, 1945, Serial No. 636,899

6 Claims. (Cl. 164—43)

The present invention relates to power-operated, heavy duty shears and, more particularly, to the means for adjusting the clearance between the shearing knives thereof.

The clearance between the shearing knives of heavy duty shears of the general type employed in shops engaged in fabricating metal plates and the like must be changed for each different gauge or thickness of material to be sheared. The various constructions heretofore employed for accomplishing the aforesaid adjustment have been unsatisfactory for one reason or another. With the foregoing in mind, the principal object of the present invention is the provision of a novel and improved, power-operated, heavy duty shears of the character referred to having an oscillating upper leaf and improved means for conveniently adjusting the clearance between the shearing knives, which means is simple in construction, reliable in operation, and convenient to operate.

The invention resides in certain constructions and combinations and arrangements of parts, and further objects and advantages will be apparent to those skilled in the art to which it relates from the following description of the preferred embodiment described with reference to the accompanying drawings forming a part of this specification in which similar reference characters designate corresponding parts throughout the several views, and in which Fig. 1 is a front elevational view of a power-operated, heavy duty shears embodying the present invention;

Fig. 3 is an end view of the shears shown, looking from the right of Fig. 1;

Fig. 4 is a fragmentary sectional view, with portions in elevation, approximately on the line 4—4 of Fig. 3;

Fig. 5 is a fragmentary sectional view approximately on the line 5—5 of Fig. 1;

Figure 1:
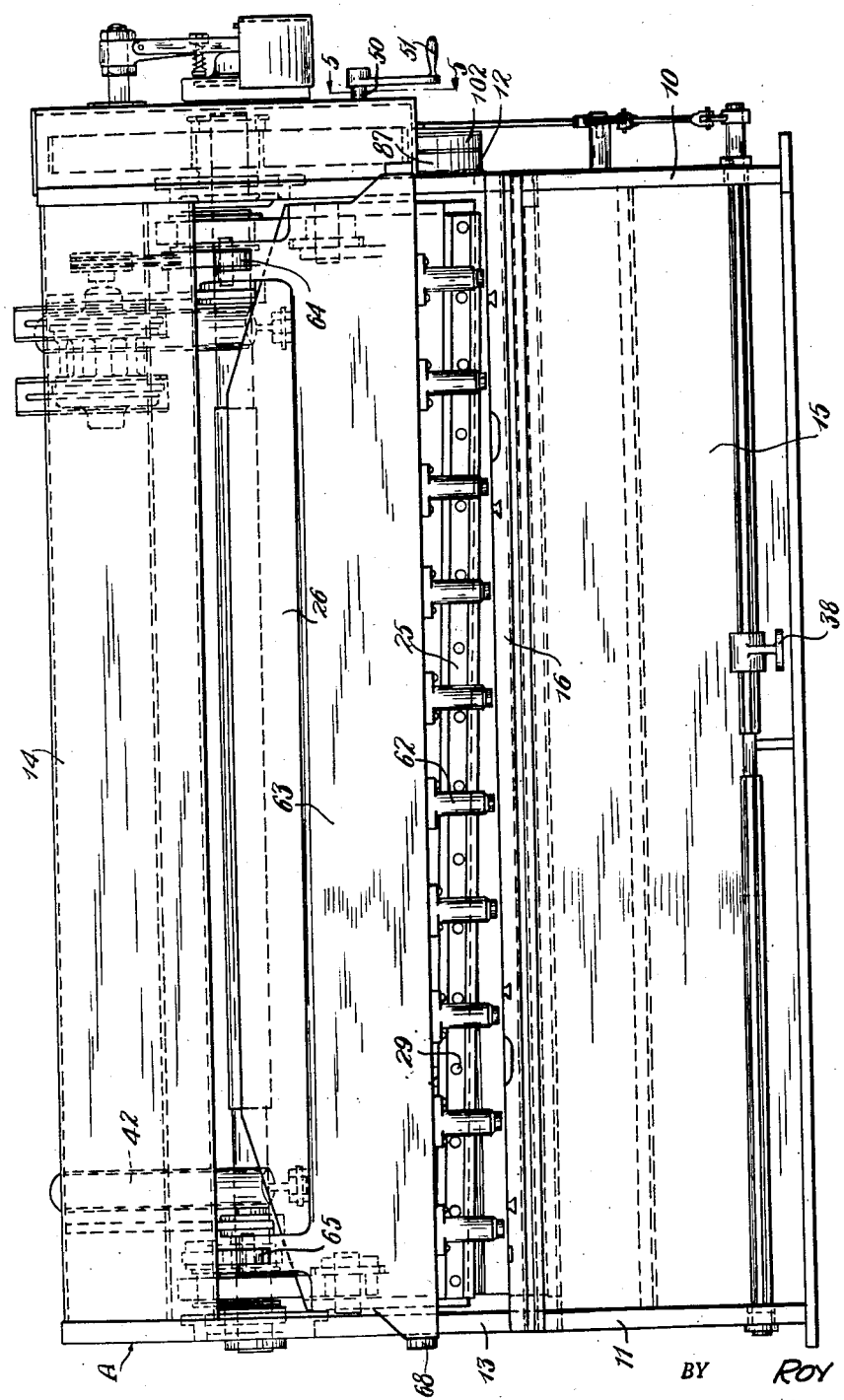
Figure 2:
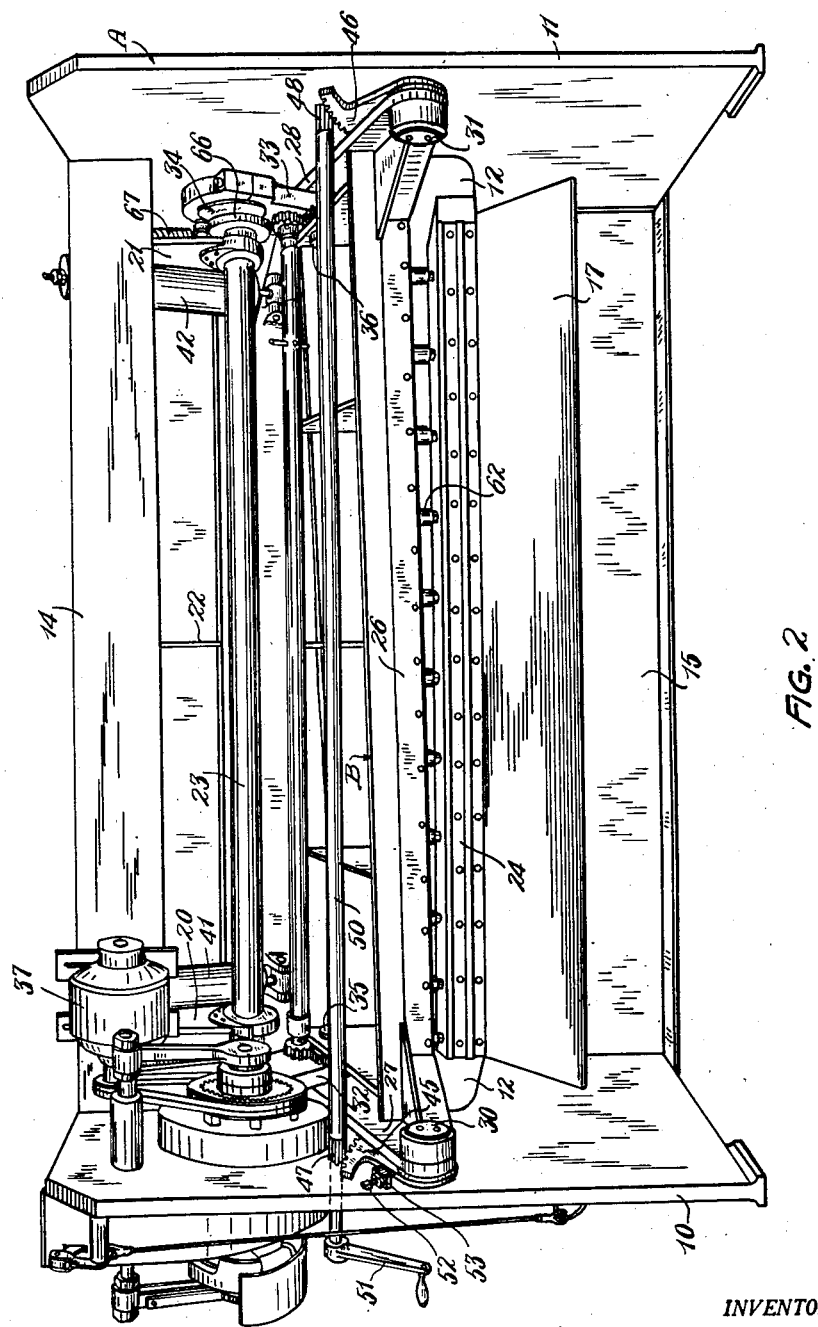
Fig. 2 is a rear view of the shears shown in Fig. 1.

The shears shown herein are similar to the shears shown and described in a copending application of William G. Wehr, Serial No. 532,078, filed April 21, 1944, upon which U. S. Patent No. 2,397,896, issued on April 2, 1946, and only those parts of the shears which are necessary to a complete understanding of the present invention are herein shown and described in detail. Reference to the aforesaid application is made for a complete showing and description of those parts of the shears not fully shown and described herein.

Referring to the drawings, the reference character A designates a frame comprising stress-resisting, plate-like end members or side housings 10, 11 having aligned openings 12, 13, respectively, in their front edges; a crown 14; and a bed comprising plate-like members 15, 16 and 17, the latter of which forms a scrap chute. The vertical plate-like member 15 is located immediately to the rear of and is welded to the horizontal plate-like member 16, which member in addition to reinforcing the upper edge of the member 15, forms a support or work table for the work. The upper member or crown 14 is generally box-shaped in cross-section and has its opposite ends welded to the side housings 10, 11 adjacent to their front upper edges. Web members 20, 21 and 22 welded to the interior of the member 14 reinforce the same and the lower ends of the members 20, 21 which extend below the rear side of the member 14 or supports for suitable bearings within which a crankshaft 23 is rotatably supported.

The shearing operation is performed by a stationary shearing knife 24 located in a cut-out portion at the upper rear corner of the bed and a movable shearing knife 25 connected to the lower front edge of a movable ram or blade, designated generally by the reference character B. The movable ram or upper blade B, which extends substantially from one side housing to the other, is of built-up construction and comprises a longitudinally extending front plate 26 welded to the front ends of rearwardly extending end members 27, 28, the rear ends of which are rotatably connected to short shaft-like members 30, 31 rotatably supported in suitable apertures in the side housings 10, 11, respectively, for rotation about an axis $a$ eccentric to the axis $b$ about which the end members 27, 28 are connected thereto. The axis $a$ about which the ram or blade B is pivoted is preferably slightly above the plane of the work supporting surface of the bed.

The front plate 26 of the blade B is inclined at a slight angle to the vertical, as clearly shown in Fig. 3, to provide clearance between the ram or blade B and the stationary shearing knife when the blade is moved in a downward direction. The lower front edge of the plate 26 is cut out so as to receive the upper shearing knife 25, which knife is held in position therein by a plurality of screws 29 projecting therethrough and threaded into suitably tapped apertures adjacent to the lower edge of the plate 26. The heads of the screws 29 are located in a groove in the front face of the shearing knife and are countersunk so as not to interfere with the oscillation of the movable blade B. The lower edge of the plate 26 is inclined lengthwise so that the knives will effect a true shearing action.

The front end of the ram or movable blade B is supported and the entire blade assembly is adapted to be oscillated about the shafts 30, 31 by pitmans 32, 33, the upper ends of which are operatively connected to eccentrics 34 on the crankshaft 23 and the lower ends of the pitmans to short shafts 35, 36 fixed in opposite ends of the blade B. The construction, including the location of the crankshaft 23 and the shafts 35, 36 with respect to the knives, is preferably such that the resultant of the shearing forces passes susbtantially through the centerlines of the pitmans or connecting rods 32, 33, with the result that very little load is carried by the shafts or pivots 30, 31.

The crankshaft 23 is rotated to reciprocate the movable ram or blade B by an electric motor 37 adustably secured to the back of the crown 14 and operatively connected to the crankshaft by means including a friction clutch and brake operated in such a manner that when the treadle 38 is depressed and immediately released, the crankshaft makes one complete revolution but will continue to rotate as long as the foot pedal is depressed. As shown, the weight of the movable blade B is counterbalanced by adjustable compression springs, one at either end of the ram, located within tubular housings 41, 42 fixed to the crown member 14.

According to the provisions of the present invention, the shafts 30, 31 can be simultaneously rotated about their axes $a$ so as to change or vary the clearance between the shearing knives 24, 25. For this purpose the shafts 30, 31 are provided with gear sectors 45, 46, respectively, keyed thereto immediately inside of the side housings 10, 11. The gear segments 45, 46 are continuously in mesh with pinion gears 47, 48 formed integral with a transversely extending shaft 50 rotatably supported in suitable apertures in the side housings 10, 11. Either or both ends of the shaft 50 may extend beyond the side housings where provision can be made for rotating the same. As shown, the right-hand end of the shaft 50 extends beyond the side housing 10 where it is provided with a hand crank 51 for rotating the same. An adjustable zero clearance stop in the form of a screw 52 threaded into a member 53 welded onto the inside of the side housing 10 prevents moving the gear sector 45 until the knives strike against each other. The screw 52 is provided with a jam nut for securing it in any adjusted position.

Provision is also made for locking the shaft 50 against rotation during operation of the press in the form of a member 55 bolted to the outside of the side housing 10 and having an aperture through which the shaft 50 extends. The member 55 has a split 56 opening into the lower side which extends to the aperture through which the shaft 50 projects. The lower ends 57, 58 of the member 55 are adapted to be moved toward each other to clamp the shaft 50 against rotation by a member 60 threaded into a suitably tapped aperture in the end 57 and projecting through an aperture in the end 58. A collar 61 on the member 60 forms a shoulder which abuts against the side of the member 55 to draw the ends 57, 58 thereof together upon rotation of the member 60 in the right-hand direction. Rotation of the member 60 in the opposite direction allows the ends 57, 58 to spring apart and release the shaft 50.

If desired, the mechanism for operating the shaft 50 can be extended to the front of the machine either above or below the work table so that the knife clearance can be adjusted without going around to the side of the shears.

The shears shown also include a plurality of spring-loaded, hold-down devices 62 detachably bolted to the lower edge of a hold-down plate 63 suspended from the forward arms of bell crank levers 64, 65 pivotally connected to the plates 20, 21, the rear arms of which levers are provided with rollers adapted to engage cams 66 on the crankshaft 23. The levers 64, 65 are continuously urged in a clockwise direction, as viewed in Fig. 3, to engage the rollers thereon with the cams 66 by suitable compression springs 67 interposed therebetween and the top of the crown member 14. The lower part of the hold-down plate 63 is connected to the side housings 10, 11 by links 68, one at either side of the hold-down plate, which links are pivotally connected to the hold-down plate and to the side housings 10, 11.

Preferably the shear is provided with means for indicating the clearance between the shearing knives at all times. In the shear shown, the setting of the upper shearing knife 25 with respect to the lower knife 24 is indicated by a pointer 80 operatively connected to the right-hand shaft or pivot 30 for the blade B. The upper end of the pointer 80 cooperates with and moves over a scale, designated generally by the reference character 81, graduated both in plate sizes and thousandths of an inch clearance between the shearing knives. The pointer 80 is pivoted below the center of the pivot 30, as by a pin 82, to an annular boss 83 welded to a plate 84 detachably connected as by studs 85 and nuts 86 to a boss 87 on the side housing 10 surrounding the shaft or pivot 30. The scale 81 is formed upon a sheet metal member 88 located above the pivot 30 and secured to the plate 84 as by screws 89.

Figure 7:
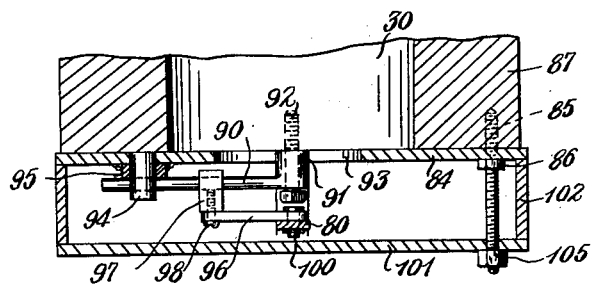
Fig. 7 is a sectional view, with portions in elevation, approximately on the line 7—7 of Fig. 6.
Figure 6:
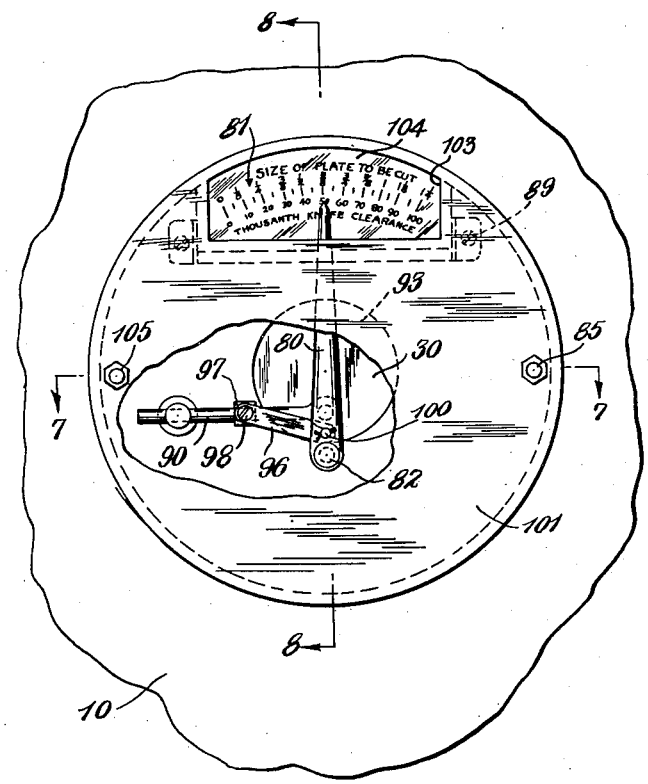
Fig. 6 is an enlarged fragmentary elevational view, with parts broken away, of a portion of Fig. 3.
Figure 8:
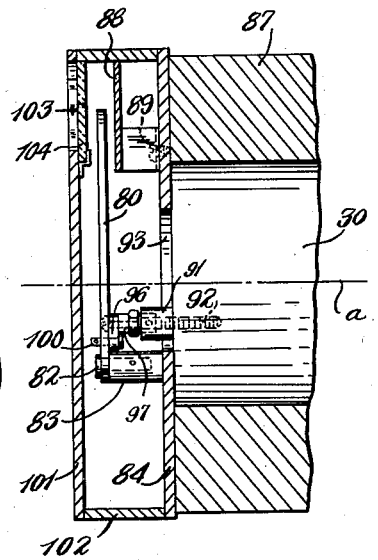
Fig. 8 is a sectional view, with parts in elevation, approximately on the line 8—8 of Fig. 6.

The pointer 80 is operatively connected to the pivot 30 by mechanism including a generally horizontal member 90. The right-hand end of the member 90, as viewed in Figs. 6 and 7, is provided with an integral boss 91 and is pivotally connected as by a screw 92 to the shaft or pivot 30 eccentric with respect to its axis of rotation $a$. The plate 84 has a centrally located circular hole 93 through which the boss 91 and screw 92 project. The left-hand end of the member 90 is slidably supported in a member 94 rotatably supported in the plate 84 and a boss 95 welded to the plate 84. The member 90 is operatively connected to the pointer 80 by a link 96 pivotally connected to a member 97 adjustably connected to the member 90 for movement lengthwise therealong by the setscrew 98 which also forms the pivot for the link 96. The right-hand end of the link 96 is pivotally connected by a pin 100 to the pointer 80 above its pivotal connection with the boss 83.

The construction of the pointer actuating mechanism is such that rotation of the pivot or shaft 30 reciprocates the member 90, which in turn moves the link 96 causing the pointer 80 to rotate about its pivot 82. The link 96 is pivotally connected to the pointer 80 adjacent to its lower end so that a relatively small movement of the shaft 30 produces a relatively large movement of the pointer 80. The indicating mechanism just described is enclosed within a removable cover plate 101 of substantially the same size and shape as the plate 84 and spaced therefrom by an annular flange or ring 102 welded to the member 84. The cover plate 101 has an opening or window 103 in the upper part thereof through which the upper end of the pointer 80 and the scale 81 is visible. The opening 103 is provided with a glass or transparent member 104 which prevents the entrance of dirt into the dial mechanism. Nuts 105 threaded onto the projecting ends of the studs 85 hold the cover plate 101 in position. The setscrew 93 provides means for resetting the pointer 80 to zero upon regrinding of the knives, etc. The knife clearance indicating means may be connected to either of the shafts 30, 31 or 50 and may be extended by a Bowden wire or similar mechanism to the front of the shears, in which event the indicating means proper may be located either above or below the work table.

From the foregoing it will be apparent that the objects of the invention heretofore enumerated and others have been accomplished and that there has been provided a novel and improved shears of the character referred to comprising improved simple means for adjusting the clearance between the shearing knives. While the preferred embodiment of the invention has been described in considerable detail, I do not wish to be limited to the particular construction shown which may be varied within the scope of this invention, and it is my intention to hereby cover all adaptations, modifications and uses thereof which come within the practice of those skilled in the art to which the invention relates and within the scope of the appended claims.

Having thus described my invention, I claim:

1. In a power operated, heavy duty, metal shears of the character referred to, the combination of: a frame comprising horizontally spaced, generally vertical side housings and a bed having a generally horizontal surface, adapted to support material or work to be sheared, connected to said side housings adjacent to the front thereof; said bed being adapted to have a shearing knife detachably connected thereto adjacent to its upper rear edge; a movable ram or blade intermediate said side housings and extending substantially the entire distance therebetween; means including a plurality of shafts mounted in said side housings; said shafts each having an eccentric portion for pivotally supporting said movable ram or blade for movement about an axis generally parallel with the upper rear edge of said bed; said movable ram or blade having its lower front edge adapted to have a shearing knife detachably attached thereto; a plurality of gear-like members, one fixedly connected to each of said shafts intermediate the side housing within which the respective shaft is supported and the adjacent side of the ram or blade; a plurality of pinion gears, one in mesh with each of said gear-like members; means for simultaneously rotating said pinion gears for varying the clearance between the shearing knives; and power actuated means pivotally connected to said ram or blade adjacent to the front thereof for oscillating said ram or blade about said axis to cause a cutting edge of the shearing knife carried thereby to move across a cutting edge of the shearing knife carried by said bed.

2. In a power operated, heavy duty, metal shears of the character referred to, the combination of: a frame comprising horizontally spaced, generally vertical side housings and a bed having a generally horizontal surface, adapted to support material or work to be sheared, connected to said side housings adjacent to the front thereof; said bed being adapted to have a shearing knife detachably connected thereto adjacent to its upper rear edge; a movable ram or blade intermediate said side housings and extending substantially the entire distance therebetween; means including a plurality of shafts supported by said side housings; said shafts each having an eccentric portion for pivotally supporting said movable ram or blade for movement about an axis generally parallel with the upper rear edge of said bed; said movable ram or blade having its lower front edge adapted to have a shearing knife detachably attached thereto; a plurality of gear-like members, one fixedly connected to each of said shafts intermediate the side housing within which the respective shaft is supported and the adjacent side of the ram or blade; a shaft rotatably supported by said side housings and extending therebetween; a plurality of pinion gears on said shaft, one in mesh with each of said gear-like members; means for rotating said shaft for varying the clearance between the shearing knives; and power actuated means pivotally connected to said ram or blade adjacent to the front thereof for oscillating said ram or blade about said axis to cause a cutting edge of the shearing knife carried thereby to move across a cutting edge of the shearing knife carried by said bed.

3. In a power operated, heavy duty, metal shears of the character referred to, the combination of: a frame comprising horizontally spaced, generally vertical side housings and a bed having a generally horizontal surface, adapted to support material or work to be sheared, connected to said side housings adjacent to the front thereof; said bed being adapted to have a shearing knife detachably connected thereto adjacent to its upper rear edge; a movable ram or blade intermediate said side housings and extending substantially the entire distance therebetween; means including a plurality of shafts mounted in said side housings; said shafts each having an eccentric portion for pivotally supporting said movable ram or blade for movement about an axis generally parallel with the upper rear edge of said bed; said movable ram or blade having its lower front edge adapted to have a shearing knife detachably attached thereto; a plurality of gear-like members, one fixedly connected to each of said shafts; a plurality of pinion gears, one in mesh with each of said gear-like members; means for simultaneously rotating said pinion gears for varying the clearance between the shearing knives; means for indicating the clearance between the shearing knives; and power actuated means pivotally connected to said ram or blade adjacent to the front thereof for oscillating said ram or blade about said axis to cause a cutting edge of the shearing knife carried thereby to move across a cutting edge of the shearing knife carried by said bed.

4. In a power operated, heavy duty, metal shears of the character referred to, the combination of: a frame comprising horizontally spaced, generally vertical side housings and a bed having a generally horizontal surface, adapted to support material or work to be sheared, connected to said side housings adjacent to the front thereof; said bed being adapted to have a shearing knife detachably connected thereto adjacent to its upper rear edge; a movable ram or blade intermediate said side housings and extending substantially the entire distance therebetween; means including a plurality of shafts supported by said side housing; said shafts each having an eccentric portion for pivotally supporting said movable ram or blade for movement about an axis generally parallel with the upper rear edge of said bed; said movable ram or blade having its lower front edge adapted to have a shearing knife detachably attached thereto; a plurality of gear-like members, one fixedly connected to each of said shafts intermediate the side housing within which the respective shaft is supported and the adjacent side of the ram or blade; a shaft rotatably supported by said side housings and extending therebetween; a plurality of pinion gears on said shaft, one in mesh with each of said gear-like members; means for rotating said shaft for varying the clearance between the shearing knives; means including a scale and a cooperating relatively long pointer operatively connected to said frame and said shaft at two relatively closely spaced points remote from the end of the pointer adjacent to the scale for indicating the clearance between the shearing knives; and power actuated means pivotally connected to said ram or blade adjacent to the front thereof for oscillating said ram or blade about said axis to cause a cutting edge of the shearing knife carried thereby to move across a cutting edge of the shearing knife carried by said bed.

5. In a power operated, heavy duty, metal shears of the character referred to, the combination of: a frame comprising horizontally spaced, generally vertical side housings and a bed having a generally horizontal surface, adapted to support material or work to be sheared, connected to said side housings adjacent to the front thereof; said bed being adapted to have a shearing knife detachably connected thereto adjacent to its upper rear edge; a movable ram or blade intermediate said side housings and extending substantially the entire distance therebetween; said movable ram or blade having its lower front edge adapted to have a shearing knife detachably attached thereto; means for pivotally supporting said movable ram or blade for movement about an axis generally parallel with the upper rear edge of said bed; said means including a shaft having a plurality of portions eccentric with respect to each other connected to said frame and said ram, respectively; means for rotating said shaft for varying the clearance between shearing knives carried by said bed and said ram; means including a scale and a cooperating relatively long pointer operatively connected to said frame and said shaft at two relatively closely spaced points remote from the end of the pointer adjacent to the scale for indicating the clearance between the shearing knives; and power actuated means pivotally connected to said ram adjacent to the front thereof for oscillating said ram about said axis to cause a cutting edge of the shearing knife carried thereby to move by a cutting edge of the shearing knife carried by said bed.

6. In a power operated, heavy duty, metal shears of the character referred to, the combination of: a frame comprising horizontally spaced, generally vertical side housings and a bed having a generally horizontal surface, adapted to support material or work to be sheared, connected to said side housings adjacent to the front thereof; said bed being adapted to have a shearing knife detachably connected thereto adjacent to its upper rear edge; a movable ram or blade intermediate said side housings and extending substantially the entire distance therebetween; said movable ram or blade having its lower front edge adapted to have a shearing knife detachably attached thereto; means for pivotally supporting said movable ram or blade for movement about an axis generally parallel with the upper rear edge of said bed; said means including a shaft having a plurality of portions eccentric with respect to each other connected to said frame and said ram, respectively; a gear-like member fixedly connected to said shaft; a gear in mesh with said gear-like member; means for rotating said gear for varying the clearance between shearing knives carried by said bed and said ram; means including a scale and a cooperating relatively long pointer operatively connected to said frame and said shaft at two relatively closely spaced points remote from the end of the pointer adjacent to the scale for indicating the clearance between the shearing knives; and power actuated means pivotally connected to said ram adjacent to the front thereof for oscillating said ram about said axis to cause a cutting edge of the shearing knife carried thereby to move by a cutting edge of the shearing knife carried by said bed.

ROY F. DEHN.

No references cited.